(12) United States Patent
Hert et al.

(10) Patent No.: US 12,129,365 B2
(45) Date of Patent: Oct. 29, 2024

(54) METHODS FOR OPERATING POLYETHYLENE REACTOR SYSTEMS

(71) Applicant: CHEVRON PHILLIPS CHEMICAL COMPANY LP, The Woodlands, TX (US)

(72) Inventors: Daniel G Hert, Owasso, OK (US); Bryan G. Kubsch, Bartlesville, OK (US)

(73) Assignee: Chevron Phillips Chemical Company LP, The Woodlands, TX (US)

( * ) Notice: Subject to any disclaimer, the term of this patent is extended or adjusted under 35 U.S.C. 154(b) by 82 days.

(21) Appl. No.: 17/645,048

(22) Filed: Dec. 18, 2021

(65) Prior Publication Data
US 2023/0193001 A1 Jun. 22, 2023

(51) Int. Cl.
C08L 23/06 (2006.01)
B01J 8/18 (2006.01)
B01J 8/20 (2006.01)
B01J 21/08 (2006.01)
B01J 23/652 (2006.01)
C08L 23/08 (2006.01)

(52) U.S. Cl.
CPC ............ C08L 23/06 (2013.01); B01J 8/1809 (2013.01); B01J 8/1836 (2013.01); B01J 8/20 (2013.01); B01J 21/08 (2013.01); B01J 23/6522 (2013.01); C08L 23/0815 (2013.01)

(58) Field of Classification Search
CPC ...... C08F 10/02; C08F 110/02; C08F 210/02; C08F 2/34; C08F 2/001; C08F 4/22
See application file for complete search history.

(56) References Cited

U.S. PATENT DOCUMENTS

| | | |
|---|---|---|
| 5,639,834 A | 6/1997 | Debras |
| 6,063,878 A | 5/2000 | Debras |
| 6,252,017 B1 | 6/2001 | Debras |
| 6,265,500 B1 | 7/2001 | Debras |

(Continued)

OTHER PUBLICATIONS

ASTM D1238 (Year: 2004).*

(Continued)

Primary Examiner — Mark S Kaucher
(74) Attorney, Agent, or Firm — Eversheds Sutherland (US) LLP

(57) ABSTRACT

A method of operating a polyethylene reactor system includes feeding ethylene, an optional first comonomer, a diluent, and a chromium-based catalyst to a first polymerization reactor. The method further includes contacting ethylene and the comonomer with the catalyst in the first polymerization reactor to form a first product including a first polyethylene. The method further includes feeding the first product from the first polymerization reactor to a second polymerization reactor. The method further includes contacting ethylene and a second optional comonomer with catalyst from the first reactor in the second polymerization reactor to form a second product including the first polyethylene and a second polyethylene. The method further includes controlling one or both of a molecular weight or a breadth of molecular weight distribution of the second product by adjusting a rate of hydrogen fed to one or both of the first polymerization reactor or the second polymerization reactor.

24 Claims, 3 Drawing Sheets

(56) References Cited

U.S. PATENT DOCUMENTS

| | | |
|---|---|---|
| 6,291,602 B1 | 9/2001 | Koch |
| 7,745,551 B2 | 6/2010 | Bodart |
| 8,956,573 B2 | 2/2015 | Fouarge |
| 2012/0053304 A1* | 3/2012 | Fouarge ................ B01J 8/0015 526/64 |
| 2015/0141592 A1 | 5/2015 | Lynch |
| 2015/0166697 A1* | 6/2015 | Vantomme .............. C08F 10/02 526/64 |

OTHER PUBLICATIONS

IUPAC Compendium of Chemical Terminology, 2nd Ed. 1997, pp. 1-1670.

International Search Report and Written Opinion issued in corresponding PCT Application No. PCT/US2022/080960, mailed on Mar. 13, 2023, 8 pp.

\* cited by examiner

METHODS FOR OPERATING POLYETHYLENE REACTOR SYSTEMS

CROSS REFERENCE TO RELATED APPLICATIONS

None.

TECHNICAL FIELD

This disclosure relates to techniques and systems for polyethylene production, and in particular, to techniques for operating multi-reactor systems.

BACKGROUND

Single- or multiple-reactor systems may be used to produce polymer resins, such as polyethylene. For example, loop reactors have been advantageous in polyethylene production. The properties of a polyethylene depend on the particular characteristics of the polymer such as chain length and molecular weight distribution, and the applications and articles for which a particular resin can be used depend on such characteristics of the polymer. These characteristics, in turn, are affected by the parameters used to control the polymer production process.

A need remains for methods for new and improved operating reactor systems and processes which may provide more control to produce polymers having tailored properties.

SUMMARY OF THE DISCLOSURE

This summary is provided to introduce various concepts in a simplified form that are further described below in the detailed description. This summary is not intended to identify required or essential features of the claimed subject matter nor is the summary intended to limit the scope of the claimed subject matter.

In aspects, the present disclosure describes a method of operating a polyethylene reactor system. The method can include feeding ethylene, a first optional comonomer, a diluent, and a chromium-based catalyst to a first polymerization reactor. The method further includes contacting ethylene and the first optional comonomer with the catalyst in the first polymerization reactor to form a first product including a first polyethylene. The method further includes feeding the first product from the first polymerization reactor to a second polymerization reactor. The method further includes contacting ethylene and a second optional comonomer with catalyst from the first reactor in the second polymerization reactor to form a second product including the first polyethylene and a second polyethylene. The method further includes discharging the second product from the second polymerization reactor. The method further includes controlling one or both of a molecular weight or a breadth of molecular weight distribution of the second product by adjusting a rate of hydrogen fed to one or both of the first polymerization reactor or the second polymerization reactor.

This summary and the following detailed description provide examples and are explanatory only of the disclosure. Accordingly, the foregoing summary and the following detailed description should not be considered to be restrictive. Additional features or variations thereof can be provided in addition to those set forth herein, such as for example, various feature combinations and sub-combinations of these described in the detailed description.

BRIEF DESCRIPTION OF THE DRAWINGS

The following figures form a part of the present disclosure and are included to further demonstrate certain aspects of the present invention. The invention may be better understood by reference to one or more of these figures in combination with the detailed description of the specific embodiments presented herein.

Figure 1:
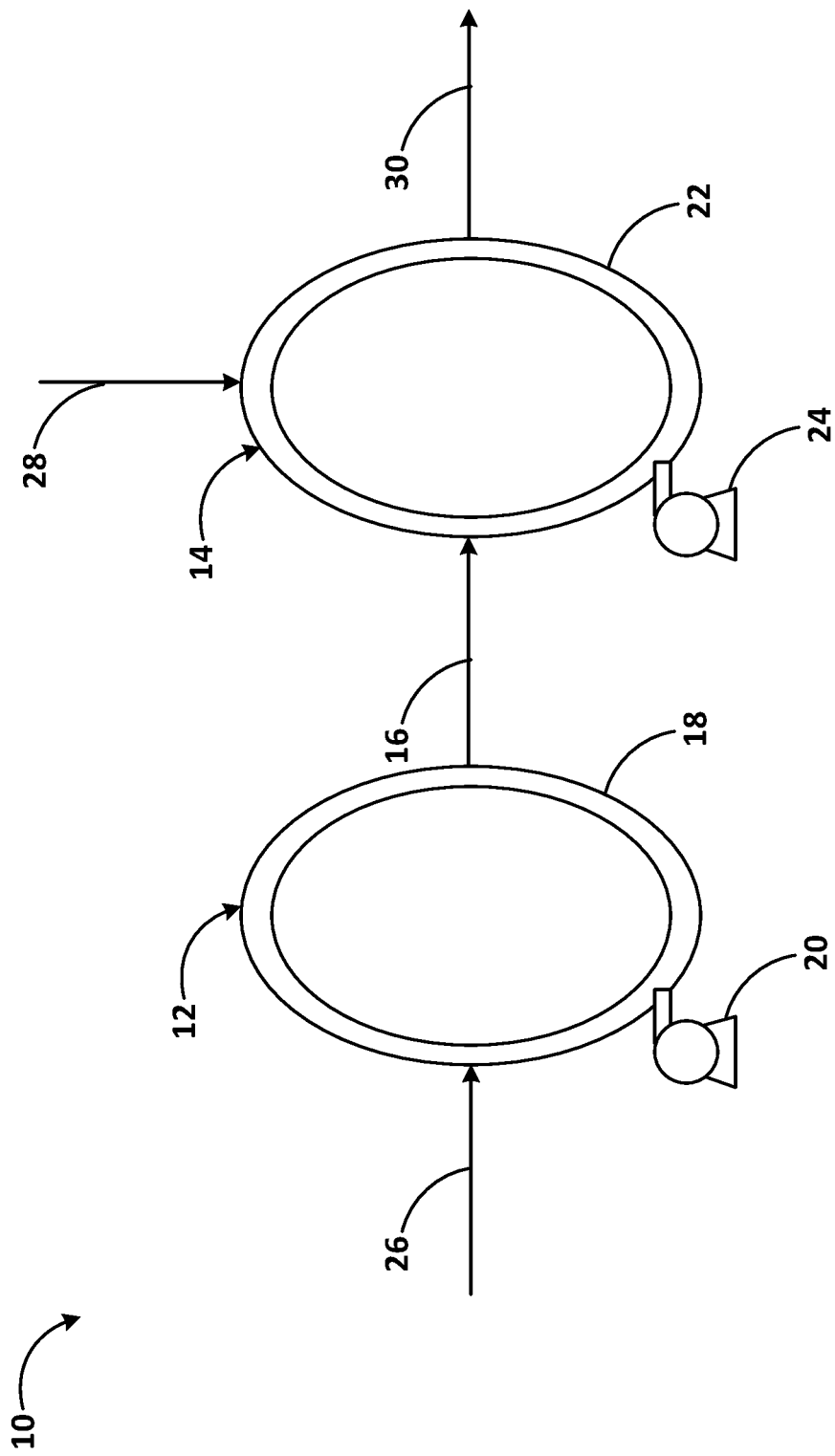
FIG. 1 is a conceptual diagram showing a polymerization system including multiple polymerization reactors.

While the inventions disclosed herein are susceptible to various modifications and alternative forms, only a few specific aspects have been shown by way of example in the drawings and are described in detail below. The figures and detailed descriptions of these specific aspects are not intended to limit the breadth or scope of the inventive concepts or the appended claims in any manner. Rather, the figures and detailed written descriptions are provided to illustrate the inventive concepts to a person of ordinary skill in the art and to enable such person to make and use the inventive concepts.

DETAILED DESCRIPTION

It is to be understood that the disclosure is not limited in its application to the details of construction and the arrangement of components set forth in the following description or illustrated in the drawings.

Definitions

To define more clearly the terms used herein, the following definitions are provided. Unless otherwise indicated, the following definitions are applicable to this disclosure. If a term is used in this disclosure but is not specifically defined herein, the definition from the IUPAC Compendium of Chemical Terminology, 2nd Ed (1997) can be applied, as long as that definition does not conflict with any other disclosure or definition applied herein, or render indefinite or non-enabled any claim to which that definition is applied. To the extent that any definition or usage provided by any document incorporated herein by reference conflicts with the definition or usage provided herein, the definition or usage provided herein controls.

While compositions and methods are described in terms of "comprising" various components or steps, the compositions and methods can also "consist essentially of" or "consist of" the various components or steps, unless stated otherwise.

The terms "a," "an," and "the" are intended to include plural alternatives, e.g., at least one. The terms "including", "with", and "having", as used herein, are defined as comprising (i.e., open language), unless specified otherwise.

Various numerical ranges are disclosed herein. When Applicant discloses or claims a range of any type, Applicant's intent is to disclose or claim individually each possible number that such a range could reasonably encompass, including end points of the range as well as any sub-ranges and combinations of sub-ranges encompassed therein, unless otherwise specified. For example, all numerical end points of ranges disclosed herein are approximate, unless excluded by proviso. As a representative example, if Applicants disclose in an aspect of the disclosure that the concentration of hydrogen introduced in a reactor is in a range of about 0.1 to 1 mol %, this range should be interpreted as encompassing about 0.1% and about 1 mol % of hydrogen.

Values or ranges may be expressed herein as "about," for example, from "about" one particular value, and/or to "about" another particular value. When such values or ranges are expressed, other embodiments disclosed include the specific value recited, from the one particular value, and/or to the other particular value. Similarly, when values are expressed as approximations, by use of the antecedent "about," it will be understood that the particular value forms another embodiment. It will be further understood that there are a number of values disclosed therein, and that each value is also herein disclosed as "about" that particular value in addition to the value itself. In another aspect, use of the term "about" means±20% of the stated value, ±15% of the stated value, ±10% of the stated value, ±5% of the stated value, ±3% of the stated value, or ±1% of the stated value.

Applicant reserves the right to proviso out or exclude any individual members of any such group of values or ranges, including any sub-ranges or combinations of sub-ranges within the group, that can be claimed according to a range or in any similar manner, if for any reason Applicant chooses to claim less than the full measure of the disclosure, for example, to account for a reference that Applicant may be unaware of at the time of the filing of the application. Further, Applicant reserves the right to proviso out or exclude any individual substituents, analogs, compounds, ligands, structures, or groups thereof, or any members of a claimed group, if for any reason Applicant chooses to claim less than the full measure of the disclosure, for example, to account for a reference that Applicant may be unaware of at the time of the filing of the application.

For the purposes of the present disclosure, a "short chain" when used in the context of "short chain branching" refers to a methyl branch, an ethyl branch, or a butyl branch. Therefore the number of short chain branches in a particular polymer refers to the number methyl, ethyl, and butyl branches in a certain unit measure of the polymer, for example, the total number of methyl, ethyl, and butyl branches per 1,000 total carbon atoms in the polymer.

For the purposes of the present disclosure, "a same temperature" is within ±10% of a reference temperature, and "a same temperature range" has endpoints within ±10% of respective endpoints of a reference temperature range.

Although any methods and materials similar or equivalent to those described herein can be used in the practice or testing of the invention, the typical methods and materials are herein described.

All publications and patents mentioned herein are incorporated herein by reference for the purpose of describing and disclosing, for example, the constructs and methodologies that are described in the publications, which might be used in connection with the presently described invention. The publications discussed throughout the text are provided solely for their disclosure prior to the filing date of the present application. Nothing herein is to be construed as an admission that the inventors are not entitled to antedate such disclosure by virtue of prior invention.

The present disclosure generally relates to techniques and systems for polyethylene production, and in particular, to techniques for operating multi-reactor systems. Polymer characteristics such as polymer melt index (MI) and density may be considered to be proxies for more specific polymer architectural measures, for example, for molecular weight distribution (MWD) and short-chain branching distribution (SCBD). These properties may determine the applications/articles for which a particular resin can be used. When certain catalysts are used for polymer production in multi-reactor systems, for example, Cr/Si-based catalysts in loop reactors, higher MI required for certain applications cannot be achieved solely by controlling parameters such as reaction temperature and ethylene concentration within the reactor loop.

In aspects, the present disclosure describes a method of operating a polyethylene reactor system. The method includes feeding ethylene, a first optional comonomer, a diluent, and a chromium-based catalyst to a first polymerization reactor. The method further includes contacting ethylene and the first optional comonomer with the catalyst in the first polymerization reactor to form a first product including a first polyethylene. The method further includes feeding the first product from the first polymerization reactor to a second polymerization reactor. The method further includes contacting ethylene and a second optional comonomer with catalyst from the first reactor in the second polymerization reactor to form a second product including the first polyethylene and a second polyethylene. The method further includes discharging the second product from the second polymerization reactor. The method further includes controlling one or more of a melt index, molecular weight, or a breadth of molecular weight distribution of the second product by adjusting a rate of hydrogen fed to one or both of the first polymerization reactor or the second polymerization reactor. The concentration of ethylene in each reactor could also be used to control the melt index, molecular weight, or breadth of the molecular weight distribution.

In multi-reactor systems, for example, including two or more reactors in series, the amount of hydrogen fed to one or more reactors may be used to control characteristics such as the MI, and ultimately, various properties of the polymers ultimately produced using such reactor systems. For example, hydrogen may be added to one or more reactors in a multi-reactor system, not necessarily in equal concentrations or feed ratios, to control the particular MI of the polymer exiting each reactor. Without being bound by theory, hydrogen may serve as a chain terminator or transfer agent to control molecular weight of polymer chains.

In aspects, polyethylene may be produced using multi-reactor systems including two or more loop slurry reactors in series. Diluent, ethylene, a first optional comonomer, hydrogen, and activated Cr/Si catalyst may be added to a first polymerization reactor, maintained at a predetermined temperature. The polymer product, unreacted ethylene, unreacted comonomer, unreacted hydrogen, active catalyst, and diluent are taken off from the first polymerization reactor and fed to a second polymerization reactor. Diluent, ethylene, a second optional comonomer, and hydrogen may be added to the second polymerization reactor. In aspects, the second optional comonomer is the same as the first optional comonomer. From the second polymerization reactor, the polymer product, unreacted ethylene, unreacted comonomer, unreacted hydrogen, and diluent are taken off, and the polymer product is recovered. In such processes, the physical properties of the polymer may be controlled using reactor control variables. For example, polymer molecular weight, MI, and/or MWD may be controlled using variables such as reactor temperature, ethylene concentration, and hydrogen concentration in one or more reactors. Such variables can be controlled independently in each reactor to target specific polymer properties in each reactor outlet stream for the purposes of controlling the final product properties. Each reactor may be a loop reactor, for example, a loop slurry reactor.

The use of hydrogen enables achieving higher MI in loop slurry reactors with Cr/Si-type catalysts compared to multi-reactor systems in which hydrogen is not introduced or used as a control parameter. Further, because the MWD of product exiting each reactor can be tailored, the overall MWD of the final product can also be controlled. For example, distinct levels of hydrogen may be selectively introduced in different reactors, creating distinct, but overlapping MWDs in respective reactors, to broaden the overall MWD of the final product.

Feedstocks

A recirculating component in a loop reactor is the diluent. The diluent serves as the carrier fluid in which the solid polymer particles are suspended as it is circulated throughout the loop. The diluent also serves as a heat transfer fluid. As polyethylene is produced, significant heat is produced that needs to be pulled away from the reaction site prior to the polymer melting. The diluent may include, or consist of, or consist essentially of, isobutane. The diluent in which the polymer is carried transfers that heat to the jacketed (cooling heat transfer fluid, most commonly cooling tower water) heat transfer surfaces present on the straight legs of the loop reactor. The circulating pump operates at a sufficiently high enough flow rate (and corresponding high Reynolds number) that the flow is highly turbulent and enables a high heat transfer coefficient. Thus, one of the feedstocks fed to the reactor includes diluent. An initial amount of diluent may be supplied to commence circulation and polymer production. In aspects, additional diluent may be introduced in course of polymerization to make up for diluent losses.

The feedstock also includes reactive components that form the resulting polymer, for example, one or more of an olefin monomer, a comonomer, and a chain terminating agent. For example, the olefin monomer in polyethylene production may be ethylene, with 1-hexene used as a comonomer, and hydrogen as a chain terminating agent. Thus, in polyethylene produced with such a combination of reactive components, ethylene is the primary component of the polymer, 1-hexene is used as the comonomer interspersed among the ethylene subunits, and hydrogen terminates polymer chains.

Catalyst may also be fed to the reactor, initially, and/or as circulation commences. In aspects, the catalyst is a solid-supported metal or metal complex at which site the chemical reaction forming the polymer chain (adding ethylene, comonomer, or hydrogen to the growing polymer chain) occurs. As the polymer particle forms, the polymer is a solid within the reactor, attached to the solid support. In aspects, after the polymer is formed, the catalyst particle is encapsulated in polyethylene and embedded catalyst particles cannot be isolated or regenerated. However, unreacted catalyst particles may be recirculated to the same reactor or transferred to a next reactor.

Polymer Properties

The primary quality control parameters for polymer made in the reactor are polymer density and polymer melt index (MI). The density of the polymer is a measure of how closely the polymer molecules are packed together (for example, measured as grams/cubic centimeters). The melt index is a measure of how much polymer mass can be extruded through a die of known diameter under a constant load in a 10 minute time period (g/10 min).

Polymer Density Several variables impact how closely together polymer chains can pack and thereby affect the polymer density. Long polymer chains fold over on top of themselves and do not pack effectively, lowering the polymer density. Conversely, short polymer chains can fit closely together, resulting in a higher polymer density. Linear homopolymer polyethylene chains only have hydrogen atoms on the backbone and can fit together tightly. Polymer subunits that have pendant chains, such as 1-hexene (with a 4 carbon pendant chain), prevent close packing of the chains together and result in a lower polymer density. The more frequent the occurrence of this short-chain branching (SCB) on the polymer backbone, the lower the density of the polymer. As polyethylene chains form, a growing polymer chain can react with another chain of substantial length, resulting in a polymer with long-chain branching (LCB). LCB reduces the polymer density. As with SCB, the more frequent the occurrence of LCB on the polymer backbone, the lower the density of the polymer. As the length of the long chain branches increases, which are not fixed as the SCB are fixed, the density will decrease, as well, because the chains cannot pack as closely together.

To decrease the density in the polymerization process in the loop reactor regardless of catalyst system, the primary controlled process variable is the ratio of hexene concentration to ethylene concentration, [1-hexene]/[ethylene], in the reactor. Increasing this ratio drives more 1-hexene to be incorporated into the polymer, increasing the SCB, and driving the polymer density lower, as described in EQUATION 1, wherein $[C_{2=}]$ and $[C_{6=}]$ are the concentrations of ethylene and 1-hexene in the reactor, respectively and $k_{22}$, $k_{66}$, $k_{26}$, and $k_{62}$ are the rate of reaction of $C_{2=}$ with a $C_{2=}$-end group, $C_{6=}$ with a $C_{6=}$-end group, $C_{6=}$ with a $C_{2=}$-end group, and $C_{2=}$ with a $C_{6=}$-end group and the left-side of the equation is the relative rate of incorporation of the two monomers into the polymer backbone.

$$\frac{d[C_{2=}]}{d[C_{6=}]} = \frac{[C_{2=}](k_{22}/k_{26}[C_{2=}] + [C_{6=}])}{[C_{6=}](k_{66}/k_{62}[C_{6=}] + [C_{2=}])} \quad \text{(EQUATION 1)}$$

Increasing the polymer chain length can be used as another means of lowering the polymer density. However, chain length also affects the polymer flow behavior (melt index), which may push that property outside of the specification window for the resin. LCB is often catalyst-dependent and its applicability and methodology for controlling polymer density would be related to the behavior and response characteristics of the particular catalyst system being used.

Melt Index (MI) The polymer melt index is a measure of how much the polymer melt will flow under a constant applied load. MI is a rheological test, in that it is a measurement of flow, but can also be used as a proxy for molecular weight or chain length of a polymer. As the length of a polymer chain increases, the viscosity of the melt increases, which leads to less polymer being extruded under the same load (MI) and thereby a lower MI value. Thereby the relationship between MI and chain length are inversely correlated to one another (i.e. as chain length increases, MI decreases and vice versa).

To increase the MI in the polymerization process in the loop reactor, the targeted length of the polymer chain needs to be shortened. The methods by which shorter chain lengths are produced vary somewhat among catalyst types. For Ziegler-Natta and metallocene catalysts, the primary process control variable used to control MI is the [$H_2$]/[$C_{2=}$] ratio, wherein a higher ratio yields higher MI values. Varying reactor temperature may affect the kinetics of the chain transfer to $H_2$ but temperature is commonly not used for this control due to the sufficiently sensitive response to hydrogen as a transfer agent to control chain length. Instead, the reactor temperature is determined by the highest possible operational temperature without fouling the reactor to aid in degassing the polymer.

Chromium catalysts require a more nuanced approach to achieve a target resin MI. The chromium catalyst response to hydrogen as a chain transfer agent is lower than the previous mentioned catalyst types. The three parameters, in order of effectiveness, to control the chain length (MW, MWD), as observed in the measured MI, using chromium catalysts are i) reactor temperature, ii) ethylene concentration in the reactor, and iii) hydrogen concentration in the reactor. The relationship of chain length, also known as degree of polymerization ($DP_a$), is described by EQUATION 2 below, where $R_p$ is the rate of propagation, $k_p$ is the propagation rate constant, $k_{t,d}$ and $k_{t,c}$ are the termination by disproportion and combination rate constants, respectively, $k_{tr,C2=}$ is the transfer to an ethylene molecule rate constant, $k_{tr,cat}$ is the transfer to catalyst rate constant, $k_{tr,C6=}$ is the transfer to a 1-hexene molecule rate constant, and $k_{tr,H2}$ is the transfer to a hydrogen rate constant.

i) As temperature increases, the rates of termination by disproportionation and combination (EQUATION 2; item 1) increase relative to the rate of propagation, leading to shorter chain lengths (and higher MIs).
ii) As the ethylene concentration decreases (EQUATION 2; items 1, 3, 4, 5), the chain length decreases (higher MIs). The impact of each of those terms may be muted, based on the relative transfer rate constants and concentrations in the numerator.
iii) As hydrogen concentration increases (EQUATION 2; item 5), the transfer to hydrogen molecules increases, leading to shorter chain lengths (and higher MIs).

$$\frac{1}{DP_n} = \underbrace{\frac{(2k_{t,d} + k_{t,c})R_p}{k_p^2[C_{2=}]^2}}_{(1)} + \underbrace{\frac{k_{tr,C2=}}{k_p}}_{(2)} + \underbrace{\frac{k_{tr,cat}[\text{catalyst}]}{k_p[C_{2=}]}}_{(3)} + \underbrace{\frac{k_{tr,C6=}[C_{6=}]}{k_p[C_{2=}]}}_{(4)} + \underbrace{\frac{k_{tr,H2}[H_2]}{k_p[C_{2=}]}}_{(5)} \quad \text{(EQUATION 2)}$$

For many polyethylene production grades, the specification of polymer density and melt index is sufficient to ensure that the polymer will meet its ultimate need by customers in an application. Polymer properties needed for applications can be complex, including film tear, melt strength, degree of shear thinning under stress, environmental stress crack resistance, etc. However, these properties are functions of primarily how long the polymer chains are (molecular weight, MW), the proportion of chains of that length (molecular weight distribution, MWD), and the degrees of branching present in those chains (short- and long-chain branching, SCB and LCB). For a product suitable for an application, certain parameters affecting sample quality are nearly fixed so as to ensure repeatability (for example, reactor temperature, and feedstock concentrations). The measurable outputs of those parameters are the quality control variables tested (for example, density and MI). As the catalyst being used for these grades makes a similar MWD breadth at similar reactor temperatures, the process parameters described above are then used to fine-tune the resin using these outputs to achieve properties conforming to specification to reliably produce resin per specification.

Polymers may be produced using systems including dual loop reactors. A dual loop slurry process may be similar in many aspects to a single loop slurry. For example, the individual loop reactors in the dual loop configuration are closed loops unto themselves, with the exception of a crossover line coupling the reactors, and the contents are circulated by one or more circulating pumps. The process may be controlled using suitable process parameters, for example, reactor temperature and pressure. The feed to the first loop reactor in the dual loop configuration may be similar to that in a single loop configuration. For example, the feed may include a monomer (for example, ethylene), a comonomer (for example, 1-hexene), hydrogen, a catalyst (for example, a silica-supported chromium catalyst), and diluent (for example, isobutane). The products of the first polymerization reactor, including still-active unreacted catalyst, are then passed from the first polymerization reactor to the second polymerization reactor through the crossover line. Additional feed (primarily monomer and diluent, with the possibility of additional comonomer and hydrogen) is added to the second polymerization reactor, where polymer continues to be made according to the underlying principles and mechanisms of polymerization for the second polymerization reactor operating conditions.

Melt index may be used to control polymer production in dual loop reactors, for example, producing polyethylene using metallocene or Ziegler-Natta catalysts, using hydrogen concentration or hydrogen/ethylene concentration ratio as a primary process control variable.

In dual loop processes using chromium catalysts, reactor temperature and ethylene concentration are conventionally used as the process control variables control the product MI. However, utilizing hydrogen concentration and/or hydrogen/ethylene concentration ratio enables an additional degree of freedom in operating the loop reactors and making products conforming to specification.

Thus, techniques according to the present disclosure can be used to operate polyethylene reactor systems to form polymers having predetermined molecular weight distributions and densities, using hydrogen as a control parameter in dual-loop reactors with chromium catalyst-based polymerization. In addition to using reactor temperature and ethylene concentration as process variables to control the molecular weight of chains, hydrogen is also a useful process control variable for controlling polymer molecular weight. Techniques according to the present disclosure may be used to enable finer tuned control of polymer properties and ease of operation for production of such resins, whether the resin is preferred to have the same properties in each of the reactors or distinct properties in each of the reactors to form a combined or composite resin at the outlet of the reactor system.

FIG. 1 is a conceptual diagram showing a polymerization system 10 including multiple polymerization reactors. Polymerization system 10 includes a first polymerization reactor 12 fluidically coupled to a second polymerization reactor 14 via a crossover line 16. In aspects, the first polymerization reactor 12 includes a first loop reactor and the second polymerization reactor 14 includes a second loop reactor. For example the first loop reactor may include a first loop 18 coupled to a first pump 20 for circulating contents of the first loop 18. Similarly, the second loop reactor may include a second loop 22 coupled to a second pump 24 for circulating contents of the second loop 22. The first loop 18 and the second loop 22 may include multiple sections joined together, such as legs and elbows. The first loop 18 and the second loop 22 may include cooling systems, such as cooling jackets. In aspects, he first loop reactor and the second loop reactor have a same volume. In aspects, the first loop reactor and the second loop reactor differ in volume by a factor of 0.5 to 1.5.

While polymerization reactor system 10 may include no more than two polymerization reactors, in other aspects, polymerization reactor system 10 may include more than two reactors in series, and the multiple reactors may be configured in a similar manner to first and second polymerization reactors 12 and 14. For example, the second and further reactors may be configured similar to second polymerization reactor 14. In some aspects, the first through the penultimate reactors are operated similar to first polymerization reactor 12, and the last reactor may be configured similar to second polymerization reactor 12.

A feed line 26 may be coupled to the first polymerization reactor 12. While a single feed line 26 is shown in FIG. 1, polymerization system 10 may include two or more feed lines for supplying the first polymerization reactor 12. In aspects, more than one reactant or constituent may be fed to the first polymerization reactor 12 through feed line 26. In some aspects, all constituents fed to the first polymerization reactor 12 are introduced through the same feed line 26.

A first product from the first polymerization reactor 12 may be transferred via the crossover line 16 to the second polymerization reactor 14. The first product may include reaction products and unreacted constituents from the first polymerization reactor 12. In some aspects, no additional constituents are fed to the second polymerization reactor 14, and all constituents are only introduced through the crossover line 16. In other aspects, at least one additional constituent, or a fresh supply of at least one similar constituent as fed to the first polymerization reactor 12, is fed to the second polymerization reactor 14, for example, via a second feed line 28. In some aspects, the second feed line 28 may be coupled to the crossover line 16, rather than being introduced as a separate line. In some aspects, multiple feed lines may be coupled to the second polymerization reactor 14. Thus, like the first polymerization reactor 12, the second polymerization reactor 14 may receive one, more than one, or all constituents through a single line (such as the crossover line 16), or through additional inputs such as one or more feed lines (such as the second feed line 28).

An output line 30 is coupled to the second polymerization reactor 14, and a second product is withdrawn from the output line 30. In some aspects, no product is withdrawn from the first polymerization reactor, and the only product ultimately withdrawn from the polymerization system 10 is from the output line 30. In other aspects, a partial, fractional, or first product stream may be withdrawn from another output line coupled to the first polymerization reactor 12, and a second product stream may be withdrawn from the outline line 30. The first and the second product streams may be combined to yield a combined product. The product, regardless of the particular outlet used, may be further processed, for example, to remove residual unreacted constituents. In aspects, the product includes polyethylene.

In some aspects, an olefin monomer with catalyst, is fed to the polymerization system 10, to produce a polyolefin produced by a catalytic reaction over the catalyst. Thus, polymerization system 10 may be a polyolefin production system. In some aspects, ethylene is polymerized with 1-hexene as a comonomer, and with hydrogen as a chain terminating agent or transfer agent, over a catalyst. Thus, polymerization system 10 may be a polyethylene production system. The amount, concentration, or flow rate of hydrogen introduced into the polymerization system 10 may be used as a control variable to produce a polymer (or a polyolefin, or a polyethylene in particular) having properties substantially conforming to predetermined specifications.

Figure 2:
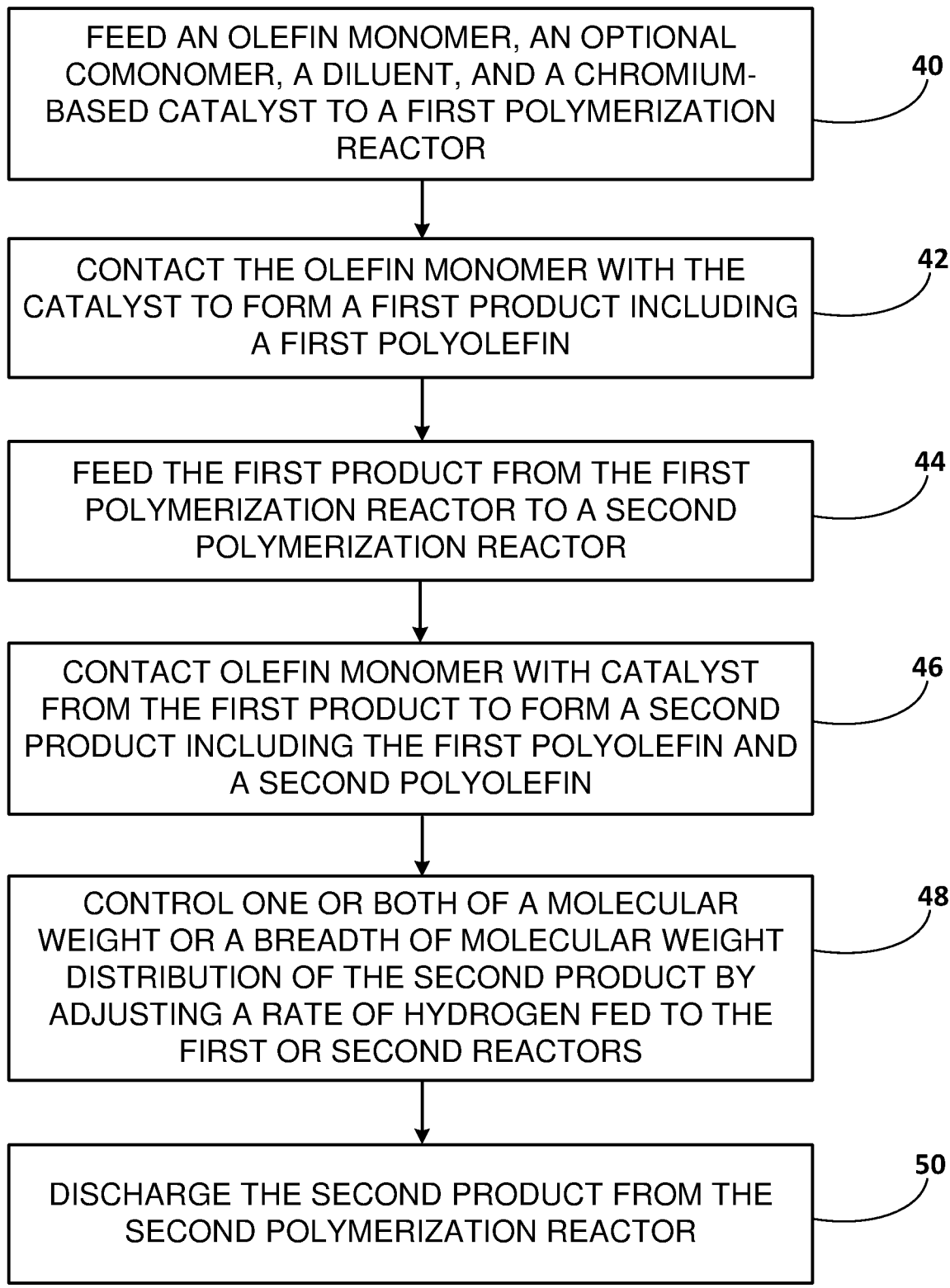
FIG. 2 is a flow diagram showing a method for operating a polyethylene reactor system.

Various methods for polymer production according to the present disclosure may be practiced using the polymerization system 10 of FIG. 1. For convenience, the method of FIG. 2 is described with reference to the polymerization system 10. However, any other suitable polymerization system may be used to produce polymers using various methods according to the present disclosure.

FIG. 2 is a flow diagram showing a method for operating a polyethylene reactor system. The polymerization reactor system may be the polymerization reactor system 10 of FIG. 1. At step 40, the method includes feeding an olefin monomer, a first optional comonomer, a diluent, and a chromium-based catalyst to the first polymerization reactor 12. In aspects, the olefin monomer includes, consists of, or consists essentially of ethylene. In aspects, the first optional comonomer includes an alpha-olefin including from 3 to 8 carbon atoms. In some such aspects, the comonomer includes 1-hexene. In aspects, the chromium-based catalyst is a silica-supported catalyst (Cr/silica). In other aspects, the chromium-based catalyst can be a titanium-coated silica catalyst (Cr/titania-coated silica).

At step 42, the method further includes contacting the olefin monomer and the comonomer with the catalyst in the first polymerization reactor 12 to form a first product including a first polyolefin. In aspects in which the olefin monomer includes, consists of, or consists essentially of ethylene, the first polyolefin may include, consist of, or consist essentially of a first polyethylene. The first product may be discharged from the crossover line 16.

At step 44, the method further includes feeding the first product from the first polymerization reactor 12 to the second polymerization reactor 14. The feeding (44) may include transporting the first product through the crossover line 16 from the first polymerization reactor 12 to the second polymerization reactor 14. The feeding (44) may include a passive transport, for example, via a pressure difference between the first polymerization reactor 12 and the second polymerization reactor 14, or an active transport, for example, by a motive device such as a pump. In aspects, feeding the first product to the second polymerization reactor (44) includes combining the first product with an olefin monomer (for example, ethylene) and diluent.

In aspects, the feeding the first product (44) includes combining the first product with hydrogen and feeding the combination to the second polymerization reactor. In aspects, the method further includes feeding one or more of olefin monomer, diluent, and hydrogen to the second polymerization reactor 14. In aspects, the method further includes feeding all of olefin monomer, diluent, and hydrogen to the second polymerization reactor 14.

At step 46, the method includes contacting the olefin monomer and a second optional comonomer with catalyst from the first polymerization reactor 12 in the second polymerization reactor 14 to form a second product including the first polyolefin and a second polyolefin. In aspects in which the olefin monomer includes, consists of, or consists essentially of ethylene, the first polyolefin may include, consists of, or consists essentially of a first polyethylene, and the second polyolefin may include, consist of, or consist essentially of a second polyethylene. In aspects, the second optional comonomer includes an alpha-olefin including from 3 to 8 carbon atoms. In some such aspects, the second optional comonomer includes 1-hexene. In aspects, the first optional comonomer is the same as the second optional comonomer. In other aspects, the first optional comonomer is different from the second optional comonomer. In aspects, the second product includes residual unreacted olefin monomer, residual unreacted comonomer, and residual unreacted hydrogen. The residual constituents may be recycled back to one or both of the first polymerization reactor 12 or the second polymerization reactor 14.

In aspects, the method further includes feeding catalyst to the second polymerization reactor 14. The catalyst may be introduced into (injected into) the crossover line 16, or via another feed line.

In aspects in which the polymerization reactors are loop reactors, the contacting (44) may include circulating the olefin monomer, the hydrogen, and the diluent in the first polymerization reactor 12 to produce the first product including a slurry of particles of the first polyolefin in the diluent, residual catalyst, residual unreacted olefin monomer, residual unreacted comonomer, and residual unreacted hydrogen. In some such aspects, the slurry is a first slurry, and the contacting (46) includes circulating the ethylene, the hydrogen, and the diluent in the second loop reactor to produce the second product including a second slurry of the second polyolefin in the diluent.

At step 48, the method includes controlling one or more of a molecular weight, melt index, or a breadth of molecular weight distribution of the second product by adjusting a rate of hydrogen fed to one or both of the first polymerization reactor 12 or the second polymerization reactor 14. The hydrogen may be fed through one or more of the feed line 26, the crossover line 16, or additional lines coupled to the first polymerization reactor 12 or the second polymerization reactor 14. In aspects, controlling one or more of the molecular weight, melt index, or the breadth of molecular weight distribution of the second product (48) includes adjusting the rate of hydrogen fed to the first polymerization reactor 12. In some such aspects, adjusting the rate of hydrogen includes adjusting a hydrogen/ethylene ratio fed to the first polymerization reactor 12. In aspects, controlling one or more of the molecular weight, melt index, or the breadth of molecular weight distribution of the second product includes adjusting the rate of hydrogen fed to the second polymerization reactor 14. In some aspects, one or both of a molecular weight or the breadth of molecular weight distribution are controlled. In some such aspects, adjusting the rate of hydrogen includes adjusting a hydrogen/ethylene ratio fed to the second polymerization reactor.

At step 50, the method includes discharging the second product from the second polymerization reactor 14. The discharging (50) may include discharging the second product through the output line 30.

During operation of the polymerization system 10, appropriate control parameters may be monitored, for example, via sensors, and adjusted. For example, both reactors may be maintained within a same predetermined temperature range. The maintaining may include sensing a temperature of each reactor with a temperature sensor and adjusting one or more reactor parameters (flow, circulation, heating, cooling, or the like) to maintain the respective temperatures. In aspects, the temperature range is 77° C. to 110° C. In some aspects, the temperature range is 90 to 105° C.

One of the parameters that may be monitored and adjusted is hydrogen fed to the first polymerization reactor 12 or the second polymerization reactor 14. In aspects, hydrogen is fed only to the first polymerization reactor 12. In aspects, hydrogen is fed only to the second polymerization reactor 14. In some aspects, hydrogen is fed to both the first polymerization reactor 12 and the second polymerization reactor 14. In some such aspects, the rate of all hydrogen fed to the first polymerization reactor 12 is the same as the rate of all hydrogen fed to the second polymerization reactor 14. In other such aspects, the rate of all hydrogen fed to the first polymerization reactor 12 is the less than the rate of all hydrogen fed to the second polymerization reactor 14.

In some aspects, the concentration of hydrogen introduced in one or both of the first polymerization reactor 12 and the second polymerization reactor 14 is in a range of 0.9 to 1.0 mol %. In some aspects, the ratio of hydrogen to olefin monomer (for example, ethylene) introduced in one or both of the first polymerization reactor 12 and the second polymerization reactor 14 is in a range of 0.05 to 0.20 [mol % $H_2$]/[mol % ethylene].

The product obtained by operating polymerization system may conform to predetermined specifications. In aspects, the first polyolefin (for example, the first polyethylene) and the second polyolefin (for example, the second polyethylene) in the second product define a combined monomodal molecular weight distribution. In aspects, the first polyolefin (for example, the first polyethylene) and the second polyolefin (for example, the second polyethylene) in the second product define a combined bimodal molecular weight distribution. In aspects, the first polyolefin (for example, the first polyethylene) and the second polyolefin (for example, the second polyethylene) in the second product define a combined broad molecular weight distribution.

The present disclosure describes systems and methods for operating polymerization systems including multiple reactors, to produce polyolefins, and using hydrogen as a control parameter or variable to control polymer product properties. In particular, hydrogen may be used to control polyethylene production in dual-loop reactor systems using chromium-based catalysts.

EXAMPLES

The invention is further illustrated by the following examples, which are not to be construed in any way as imposing limitations to the scope of this invention. Various other aspects, embodiments, modifications, and equivalents thereof which, after reading the description herein, can suggest themselves to one of ordinary skill in the art without departing from the spirit of the present invention or the scope of the appended claims.

Example 1

The polyethylene pilot plant in Bartlesville was operated in advanced dual-loop (ADL) configuration using chromium on silica catalyst to produce polyethylene and monitor the effect of hydrogen on the molecular weight, molecular weight distribution, and melt index of resulting polymer. The catalyst utilized to produce the polyethylene samples was 969 MPI, activated at 1475° F., which is a Cr—Si catalyst commonly used within Chevron Phillips Chemical for making HDPE. Each reactor was controlled at 220° F. using independent coolant systems. No 1-hexene (comonomer) was fed to either reactor to limit any variability due to any comonomer effect on catalyst activity or production rate or any effects of short-chain branching (SCB) on polymer density. The reactor feed rates of isobutane (diluent) and ethylene (monomer) were different between the two reactors to target similar production rates and solids concentrations in each reactor while also maintaining similar ethylene concentrations. No hydrogen was fed to the first reactor, and hydrogen was fed to the second reactor, to isolate the effects on the polymer structure. Polymer samples were taken from the first reactor immediately upstream of the crossover line (catalyst deactivated and polymer purged free of hydrocarbon prior to analysis) and polymer samples were taken from the second reactor from the purge column sample port.

Figure 3:
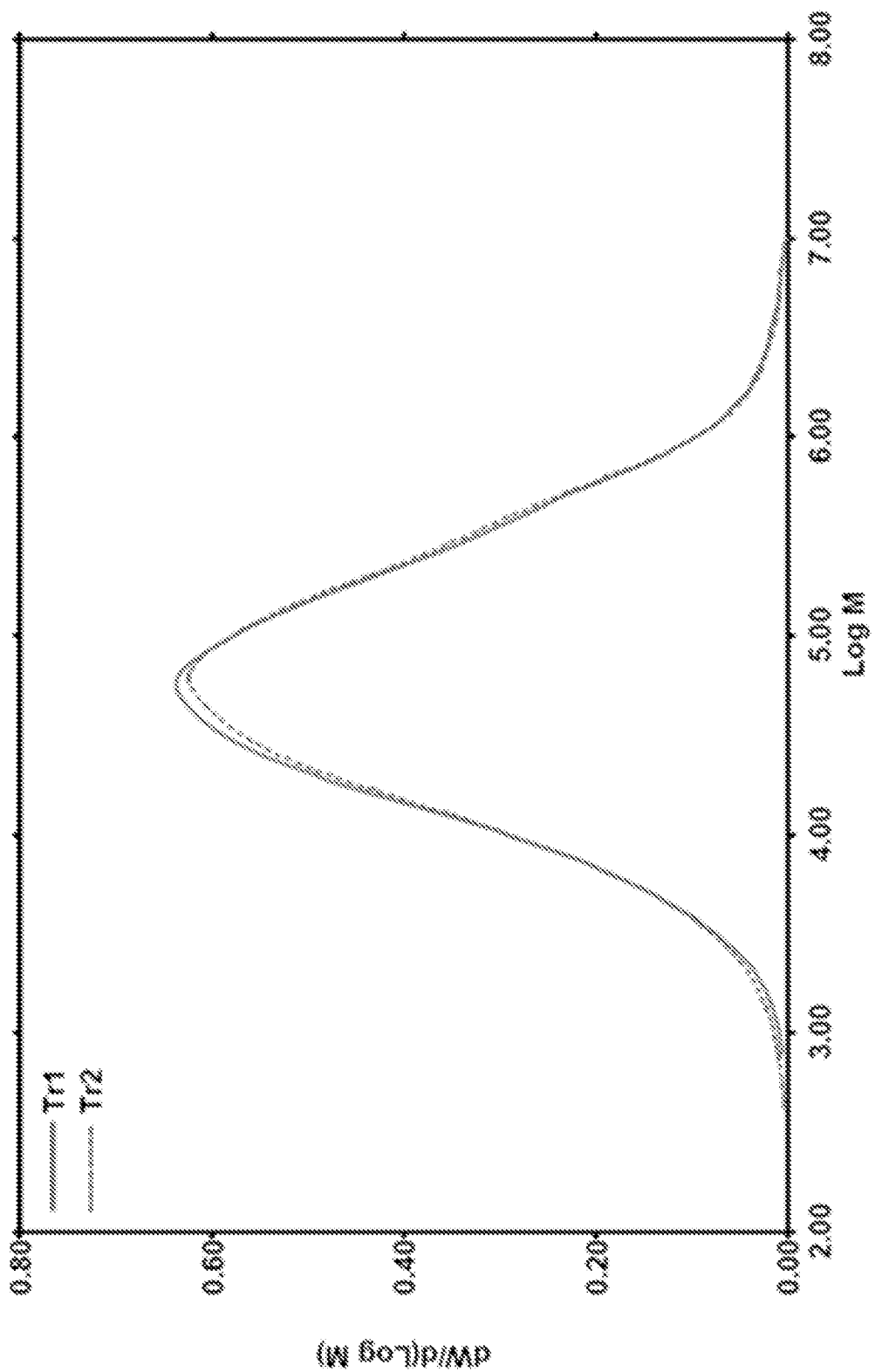
FIG. 3 is a chart showing a gel permeation chromatography (GPC) trace of polymer samples obtained from different reactor trains.

Reactor process conditions and resulting polymer properties are shown in TABLE 1 and MWDs from each reactor are shown in FIG. 3. FIG. 3 is a chart showing a gel permeation chromatography (GPC) trace of polymer samples obtained from different reactor trains. As seen in FIG. 3, Train 1 reactor had no hydrogen feed to it and train 2 reactor had $[H_2]/[C_{2=}]=0.12$ mol %/mol %. Much of the MWD overlaps with the exception of a slightly larger low molecular weight tail present in the train 2 sample.

The feeds to the reactor are for measured feeds directly to the reactor and do not include the feeds from the first reactor to the second reactor through the crossover line. All polymer, active catalyst, unreacted ethylene, unreacted hydrogen, and isobutane from the first reactor are presumed to be transferred through the crossover line from the first reactor to the second reactor in addition to the independent feeds described. All polymer properties are taken from unextruded (fluff) samples collected in the plant.

TABLE 1

Reactor process conditions and polymer properties from reactors in ADL configuration.

| Condition | Reactor 1 | Reactor 2 |
|---|---|---|
| Rx Temp (° F.) | 220 | 220 |
| $[C_{2=}]$ (mol %) | 7.6 | 7.96 |
| $[H_2]$ (mol %) | 0.0 | 0.93 |
| $[H_2]/[C_{2=}]$ (mol %/mol %) | 0.0 | 0.12 |
| $C_{2=}$ feed (lb/hr) | 32.0 | 34.0 |
| $H_2$ feed (lb/hr) | 0.0 | 0.04 |
| IC4 feed (lb/hr) | 59.9 | 70.5 |
| Solids concentration (wt %) | 33.3 | 31.3 |
| Catalyst productivity (lb PE/lb catalyst) | 990 | 1970 |
| 2.16 kg MI (g/10 min) | 0.58 | 0.54 |
| 10 kg MI (g/10 min)) | 12.08 | 11.13 |
| 21.6 kg MI (g/10 min) | 44.73 | 40.15 |
| Unannealed Polymer density (g/cc) | 0.957 | 0.962 |
| $M_n$ (kg/mol) | 22.97 | 20.29 |
| $M_w$ (kg/mol) | 182.59 | 179.64 |
| $M_z$ (kg/mol) | 1410.43 | 1303.80 |

The polymer samples from each reactor were analyzed by melt index (2.16 kg, 10.0 kg, and 21.6 kg) and unannealed density in the pilot plant QC laboratory and by gel permeation chromatography (GPC) in the Polymer Science analytical laboratory. As described above, the melt index describes a rheological phenomenon that is used as a proxy for the inverse of molecular weight of the polymer sample (higher MI, lower molecular weight). The GPC data give a direct measurement of the chain length of the sample.

The GPC data in TABLE 1 indicate that the polymer present in the reactor 2 sample is of lower average molecular weight by all three measures (the $M_n$, $M_w$, and $M_z$ values are all molecular weight averages but vary in their weighting of the MWD; $M_n$ is a simple number average molecular weight, whereas $M_w$ and $M_z$ are both weighted by the weight of the chain and the square of the weight of the chain, respectively, and are higher for samples that have a larger proportion of their chains at larger molecular weights). While the sample from the second reactor is less Gaussian within the primary peak area, it also shows a larger low molecular weight tail (left-side of the trace) than does the sample from the first reactor. The unannealed density values corroborate this data, in that the higher density of the sample from the second reactor indicates that the polymer chains pack more closely together due to shorter chain lengths. There is no effect of SCB on density, as both samples are homopolymers (no added 1-hexene), and any possible effects from long-chain branching (LCB) should generally affect both samples equally, as the catalyst used in each reactor is the same.

The melt index data, however, are higher for the polymer from the first reactor than for the sample from the second reactor, which would indicate a lower average molecular weight polymer present in the sample from the first reactor. The differences in this data may be attributable to the effect of the polymer itself at the specific rheological stresses applied during each of the tests. The shape of the full viscosity curve (as a function of deformation frequency) could elucidate any differences at high or low shear rates but the samples used for testing have been exhausted and would need to be reproduced for more extensive testing.

Moreover, the samples taken from the second reactor are a combination of the polymer made in the first reactor (without hydrogen present) and the polymer made in the second reactor (with hydrogen present) due to the nature of the material flows in ADL configuration. If possible to deconvolute the samples produced from the first and second reactors with MWD traces with high precision, differences would become plainer. A higher feed of hydrogen to the second reactor may be possible to create starker differences in the polymer architecture between the two reactors and may be possible in future work.

The invention is described above with reference to numerous aspects and embodiments, and specific examples. Many variations will suggest themselves to those skilled in the art in light of the above detailed description. All such obvious variations are within the full intended scope of the appended claims. Other aspects of the invention can include, but are not limited to, the following aspects. Many aspects are described as "including" certain components or steps, but alternatively, can "consist essentially of" or "consist of" those components or steps unless specifically stated otherwise.

ASPECTS

Aspect 1. A method of operating a polyethylene reactor system, the method including:
feeding ethylene, a first optional comonomer, a diluent, and a chromium-based catalyst to a first polymerization reactor;
contacting ethylene and the first optional comonomer with the catalyst in the first polymerization reactor to form a first product including a first polyethylene;
feeding the first product from the first polymerization reactor to a second polymerization reactor;
contacting ethylene and a second optional comonomer with catalyst from the first reactor in the second polymerization reactor to form a second product including the first polyethylene and a second polyethylene;
discharging the second product from the second polymerization reactor; and
controlling one or both of a molecular weight or a breadth of molecular weight distribution of the second product by adjusting a rate of hydrogen fed to one or both of the first polymerization reactor or the second polymerization reactor.

Aspect 2. The method of aspect 1, wherein controlling one or both of the molecular weight or the breadth of molecular weight distribution of the second product includes adjusting the rate of hydrogen fed to the first polymerization reactor.

Aspect 3. The method of aspect 2, wherein adjusting the rate of hydrogen includes adjusting a hydrogen/ethylene ratio fed to the first polymerization reactor.

Aspect 4. The method of any of aspects 1 to 3, wherein controlling one or both of the molecular weight or the breadth of molecular weight distribution of the second product includes adjusting the rate of hydrogen fed to the second polymerization reactor.

Aspect 5. The method of aspect 4, wherein adjusting the rate of hydrogen includes adjusting a hydrogen/ethylene ratio fed to the second polymerization reactor.

Aspect 6. The method of any of aspects 1 to 5, wherein feeding the first product includes combining the first product with additional ethylene and diluent.

Aspect 7. The method of aspect 6, wherein the feeding the first product includes combining the first product with hydrogen.

Aspect 8. The method of any of aspects 1 to 7, further including feeding ethylene, diluent, and hydrogen to the second polymerization reactor.

Aspect 9. The method of any of aspects 1 to 8, wherein the first polymerization reactor includes a first loop reactor and the second polymerization reactor includes a second loop reactor.

Aspect 10. The method of aspect 9, including circulating the ethylene, the hydrogen, and the diluent in the first loop reactor to produce the first product including a slurry of particles of the first polyethylene in the diluent, residual catalyst, residual unreacted ethylene, residual unreacted comonomer, and residual unreacted hydrogen.

Aspect 11. The method of aspects 9 or 10, wherein the slurry is a first slurry, the method including circulating the ethylene, the hydrogen, and the diluent in the second loop reactor to produce the second product including a second slurry of the second polyethylene in the diluent.

Aspect 12. The method of aspect 11, wherein the second product includes residual unreacted ethylene, residual unreacted comonomer, and residual unreacted hydrogen.

Aspect 13. The method of any of aspects 9 to 12, wherein the first loop reactor and the second loop reactor have a same volume.

Aspect 14. The method of any of aspects 9 to 12, wherein the first loop reactor and the second loop reactor differ in volume by a factor of 0.5 to 1.5.

Aspect 15. The method of any of aspects 1 to 14, further including feeding fresh catalyst to the second polymerization reactor.

Aspect 16. The method of any of aspects 1 to 15, wherein both reactors are maintained within a same predetermined temperature range.

Aspect 17. The method of aspect 16, wherein the temperature range is 77° C. to 110° C., is 90° C. to 105° C.

Aspect 18. The method of any of aspects 1 to 17, wherein the comonomer includes an alpha-olefin including from 3 to 8 carbon atoms.

Aspect 19. The method of any of aspects 1 to 18, wherein the first polyethylene and the second polyethylene in the second product define a combined monomodal molecular weight distribution.

Aspect 20. The method of any of aspects 1 to 19, wherein the first polyethylene and the second polyethylene in the second product define a combined bimodal molecular weight distribution.

Aspect 21. The method of any of aspects 1 to 20, wherein the first polyethylene and the second polyethylene in the second product define a combined broad molecular weight distribution.

Aspect 22. The method of any of aspects 1 to 21, wherein the rate of all hydrogen fed to the first polymerization reactor is the same as the rate of all hydrogen fed to the second polymerization reactor.

Aspect 23. The method of any of aspects 1 to 22, wherein the rate of all hydrogen fed to the first polymerization reactor is the less than the rate of all hydrogen fed to the second polymerization reactor.

Aspect 24. The method of any of aspects 1 to 23, wherein the catalyst includes silica-supported chromium or a titanium-coated silica-supported chromium.

Aspect 25. The method of any of aspects 1 to 24, wherein the concentration of hydrogen introduced is in a range of 0.9 to 1.0 mol %.

Aspect 26. The method of any of aspects 1 to 25, wherein the ratio of hydrogen to ethylene is in a range of 0.05 to 0.20 [mol % $H_2$]/[mol % ethylene].

We claim:

1. A method of operating a polyethylene reactor system, the method comprising:
    feeding ethylene, a diluent, and a chromium-based catalyst to a first polymerization reactor;
    contacting ethylene and the first optional comonomer with the catalyst in the first polymerization reactor to form a first product comprising a first polyethylene, wherein the ethylene concentration in the first polymerization reactor is from 7.5 mol % to about 8 mol %;
    feeding the first product from the first polymerization reactor to a second polymerization reactor;
    contacting ethylene and an optional comonomer with catalyst from the first reactor in the second polymerization reactor to form a second product comprising the first polyethylene and a second polyethylene, wherein the ethylene concentration in the second polymerization reactor is from about 7.5 mol % to about 8 mol %;
    discharging the second product from the second polymerization reactor; and
    controlling one or both of a molecular weight or a breadth of molecular weight distribution of the second product by adjusting a rate of hydrogen fed to the second polymerization reactor,
    wherein no hydrogen is fed to the first polymerization reactor, and
    wherein the first polyethylene and the second polyethylene in the second product define a combined monomodal molecular weight distribution.

2. The method of claim 1, wherein controlling one or both of the molecular weight or the breadth of molecular weight distribution of the second product comprises adjusting the rate of hydrogen fed to the second polymerization reactor.

3. The method of claim 2, wherein adjusting the rate of hydrogen comprises adjusting a hydrogen/ethylene ratio fed to the second polymerization reactor.

4. The method of claim 1, wherein feeding the first product comprises combining the first product with additional ethylene and diluent.

5. The method of claim 4, wherein the feeding the first product comprises combining the first product with hydrogen.

6. The method of claim 1, further comprising feeding ethylene, diluent, and hydrogen to the second polymerization reactor.

7. The method of claim 1, wherein the first polymerization reactor comprises a first loop reactor and the second polymerization reactor comprises a second loop reactor.

8. The method of claim 7, comprising circulating the ethylene and the diluent in the first loop reactor to produce the first product comprising a slurry of particles of the first polyethylene in the diluent, residual catalyst, residual unreacted ethylene, and residual unreacted comonomer.

9. The method of claim 8, wherein the slurry is a first slurry, the method comprising circulating the ethylene, the hydrogen, and the diluent in the second loop reactor to produce the second product comprising a second slurry of the second polyethylene in the diluent.

10. The method of claim 9, wherein the second product comprises residual unreacted ethylene, residual unreacted comonomer, and residual unreacted hydrogen.

11. The method of claim 7, wherein the first loop reactor and the second loop reactor have a same volume.

12. The method of claim 7, wherein the first loop reactor and the second loop reactor differ in volume by a factor of 0.5 to 1.5.

13. The method of claim 1, further comprising feeding catalyst to the second polymerization reactor.

14. The method of claim 1, wherein both reactors are maintained within a same predetermined temperature range of 77° C. to 110° C.

15. The method of claim 1, wherein the first optional comonomer comprises an alpha-olefin comprising from 3 to 8 carbon atoms.

16. The method of claim 1, wherein the catalyst comprises silica-supported chromium or a titanium-coated silica-supported chromium.

17. The method of claim 1, wherein the concentration of hydrogen introduced in the second polymerization reactor is in a range of 0.9 to 1.0 mol %.

18. The method of claim 1, wherein the ratio of hydrogen to ethylene in the second polymerization reactor is in a range of 0.05 to 0.20 [mol % $H_2$]/[mol % ethylene].

19. The method of claim 1, wherein the second optional comonomer comprises an alpha-olefin comprising from 3 to 8 carbon atoms.

20. The method of claim 1, wherein both reactors are maintained within a same predetermined temperature range of 90° C. to 105° C., and wherein the concentration of hydrogen introduced in the second polymerization reactor is in a range of 0.9 to 1.0 mol %.

21. The method of claim 1, wherein both reactors are maintained at the same predetermined reaction temperature.

22. The method of claim 1, wherein a productivity of the catalyst in the first polymerization reactor is about 50% of the productivity of the catalyst in the second polymerization reactor.

23. The method of claim 1, wherein the ethylene concentration in the first polymerization reactor or the second polymerization reactor, independently, is from about 7.6 mol % to about 7.96 mol %.

24. The method of claim 1, wherein feeding the ethylene, the diluent, and the chromium-based catalyst to the first polymerization reactor occurs through a single feed line.

* * * * *